United States Patent [19]

Yamasaki et al.

[11] Patent Number: 5,541,791
[45] Date of Patent: Jul. 30, 1996

[54] AIR GUIDE FOR AN AERODYNAMIC ACTUATOR LATCH WITHIN A DISK DRIVE

[75] Inventors: Naoki Yamasaki, Matsuyama; Masashi Watanabe, Shuso-County, both of Japan

[73] Assignee: Quantum Corporation, Milpitas, Calif.

[21] Appl. No.: 341,685

[22] Filed: Nov. 17, 1994

[51] Int. Cl.$^6$ .................. G11B 5/54; G11B 21/22; G11B 5/55; G11B 33/14

[52] U.S. Cl. .......... 360/105; 360/106; 360/109; 360/97.02

[58] Field of Search ................... 360/105, 109, 360/106, 137, 97.01, 97.02, 97.03

[56] References Cited

U.S. PATENT DOCUMENTS

| | | | |
|---|---|---|---|
| 4,249,221 | 2/1981 | Cox et al. | 360/97.02 |
| 4,647,997 | 3/1987 | Westwood | 360/105 |
| 5,036,416 | 6/1991 | Mastache | 360/105 |
| 5,043,834 | 8/1991 | Kubo et al. | 360/105 |

*Primary Examiner*—A. J. Heinz
*Assistant Examiner*—Adriana Giordana
*Attorney, Agent, or Firm*—David B. Harrison; Debra A. Chun

[57] ABSTRACT

In a disk drive, a stationary air guide for channeling windage flowing proximate a surface of a single rotating disk toward an air vane of an air vane actuator latch. The air guide has two members, a first member is positioned partially over an upper surface of the disk and a second member is positioned partially over a lower surface of the disk. The air guide members are proximate the respective surfaces in a spaced apart parallel relation thereto. Each air guide member further contains a shrouding member that maintains the air flow near the disk surface and a channeling member that channels the air flow toward the air vane. As such, windage from the rotating disk is channeled to a distal end of the air vane such that sufficient torque is produced by the windage from the single rotating disk to unlatch the latch mechanism.

4 Claims, 3 Drawing Sheets

AIR GUIDE FOR AN AERODYNAMIC ACTUATOR LATCH WITHIN A DISK DRIVE

BACKGROUND OF THE DISCLOSURE

1. Field of the Invention

The invention relates to disk drive actuator assemblies and, more particularly, to aerodynamic actuator latching mechanisms and air guides therefor.

2. Description of the Prior Art

Data storage devices employing rotating magnetic media disks are known for high capacity, low cost storage of digital data. Such disks typically contain a multiplicity of concentric data track locations, each capable of storing useful information. An actuator assembly facilitates access of the information by selectively positioning a transducer head over a selected data track. The actuator assembly typically contains a transducer head assembly containing the transducer head, a carriage assembly, and a driving mechanism.

More specifically, the transducer head assembly contains at least one magnetic head attached to a slider and the slider is, in turn, attached to a load beam that biases the slider toward the surface of the disk. The carriage assembly supports, at one end, the load beam of the transducer head assembly. At another end of the carriage assembly is an actuator motor (voice coil motor) that causes the actuator assembly to pivot about a centrally located axis (a stationery shaft) that is positioned adjacent the disk. By selectively energizing the actuator motor, the actuator assembly moves about the shaft and positions the transducer head assembly over the disk surface. Control circuitry controls the actuator motor such that the head assembly is accurately positioned relative to the tracks.

Importantly, the transducer heads are biased by the load beam against the disk surface such that, as the disk is rotating, the slider and heads "fly" on an air bearing above the disk. The spring force of the load beam (referred to herein as a preload force) maintains the heads at a prescribed distance above the rotating disk, e.g., within seven microinches. The distance above the disk surface is defined by the rotational velocity of the disk in combination with a specified preload force.

When the disk ceases rotation, the air bearing no longer overcomes the preload force. In most hard disk drives, when power is removed from the spindle motor that rotates the disk, the slider comes to rest upon the disk surface. To ensure that the slider does not come to rest upon a portion of the disk that contains recorded data, as the disk drive is powered down, the actuator assembly positions the slider over a so-called landing or parking zone on the disk surface. Typically, after power has been disconnected from the disk drive, back-EMF energy from the spindle motor is used, in a well-known manner, to power the actuator assembly and position the transducers in the landing zone. Thus, after the disk ceases to rotate, the transducers have been appropriately positioned for parking and come to rest upon the disk surface in the landing zone.

Conventionally, while the disk drive is not operating, friction between the transducers and the disk surface helps to maintain the actuator assembly in a fixed position. However, lateral mechanical shock to the disk drive can cause the slider and transducer heads to move (slide) radially across the surface of the disk. Such movement, in absence of an air bearing, may result in damage, e.g., abrasions, scratches and dents, to the surface of the disk as well as damage to the slider and transducer heads themselves. Such damage can result in a loss of data and/or transducer malfunction that can render the disk drive inoperable.

Consequently, those skilled in the art have employed a wide variety of actuator latching devices to maintain an actuator assembly in a locked position while the disk is not rotating. When the disk has attained a proper rotational velocity to produce a sufficient air bearing to support the slider, these latching devices release the actuator assembly and permit it to operate through its limited range of travel relative to the disks.

One latching technique of particular relevance to the present invention is an air vane latch. These latches typically contain an air vane latch mechanism that engages, through a spring generated bias force, a moveable portion of an actuator assembly whenever the disk is not rotating. Specifically, the air vane latch contains a rigid air vane extending from or attached to the mechanical latch mechanism. The air vane utilizes the windage from a rotating disk to unlatch the latch mechanism. Specifically, windage from the rotating disk pushes the air vane, creating enough force to overcome the bias force and disengage the latch mechanism from the actuator assembly. One example of an air vane latch is described in commonly assigned U.S. Pat. No. 4,647,997. Other examples of air vane latches are disclosed in U.S. Pat. No. 5,043,834 and 5,036,416. The disclosures of each of these patents are herein incorporated by reference.

However, to produce a sufficient force to overcome the bias force, such air vane latches require an appropriate air vane size and sufficient airflow within the disk drive enclosure. Accommodating such air vane surface size within a disk drive can require excessive spacing between the disk and disk enclosure. To ensure sufficient windage with a reasonably sized air vane, many disk drives that utilize air vane latches contain multiple disks and multiple air vanes arranged to intercept windage from both surfaces of each disk. Unfortunately, there is typically not sufficient windage to utilize an air vane latch within a disk drive having a single disk. Consequently, to produce sufficient windage in a single disk disk drive, the '997 patent discloses an air vane latch having a plastic air flow generator disk attached to the hub supporting the single storage disk. The air flow generator disk is commonly journalled in a spaced apart parallel relation with the storage disk. The air vane portion of the actuator latch extends between the storage disk and the air flow generator disk. As such, sufficient windage is produced by the rotation of both the storage disk and the air flow generator disk to move the air vane once the disks have attained sufficient velocity to create an air bearing for the transducers. Although the latch mechanism disclosed in the '997 patent functions quite well, the required air flow generator disk necessitates increasing the height dimension of the disk drive to accommodate the air flow generator disk.

Therefore, a need exists in the art for an air-guide within a disk drive enclosure that enables an air vane latch to operate in a disk drive having only a single disk without increasing the dimensions of the disk drive enclosure.

SUMMARY OF THE INVENTION

A general object of the present invention is to provide an actuator latch apparatus for a disk drive having a single disk that overcomes limitations and disadvantages of prior actuator latch approaches.

A more specific object of the present invention is to provide an air guide for an air vane actuator latch that enables the latch to be used in a disk drive having a single disk.

A further specific object of the present invention is to provide an air guide that does not increase the dimensions of the disk drive enclosure.

In accordance with the principles of the present invention, a conventional air vane actuator latch mechanism is provided proximate a disk and is releasably attached to an actuator assembly. A stationary air guide is provided to channel air flowing proximate the surface of the rotating disk toward the air vane of the air vane latch. The air guide has two members, a first member is positioned partially over an upper surface of the disk and a second member is positioned partially over a lower surface of the disk. The air guide members are proximate the respective surfaces in a spaced apart parallel relation thereto. Each air guide member further contains a shrouding member that maintains the air flow near the disk surface and a channeling member that channels the air flow toward the air vane. As such, windage from the rotating disk is channeled to a distal end of the air vane such that sufficient torque is produced by the windage from the single rotating disk to unlatch the latch mechanism.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
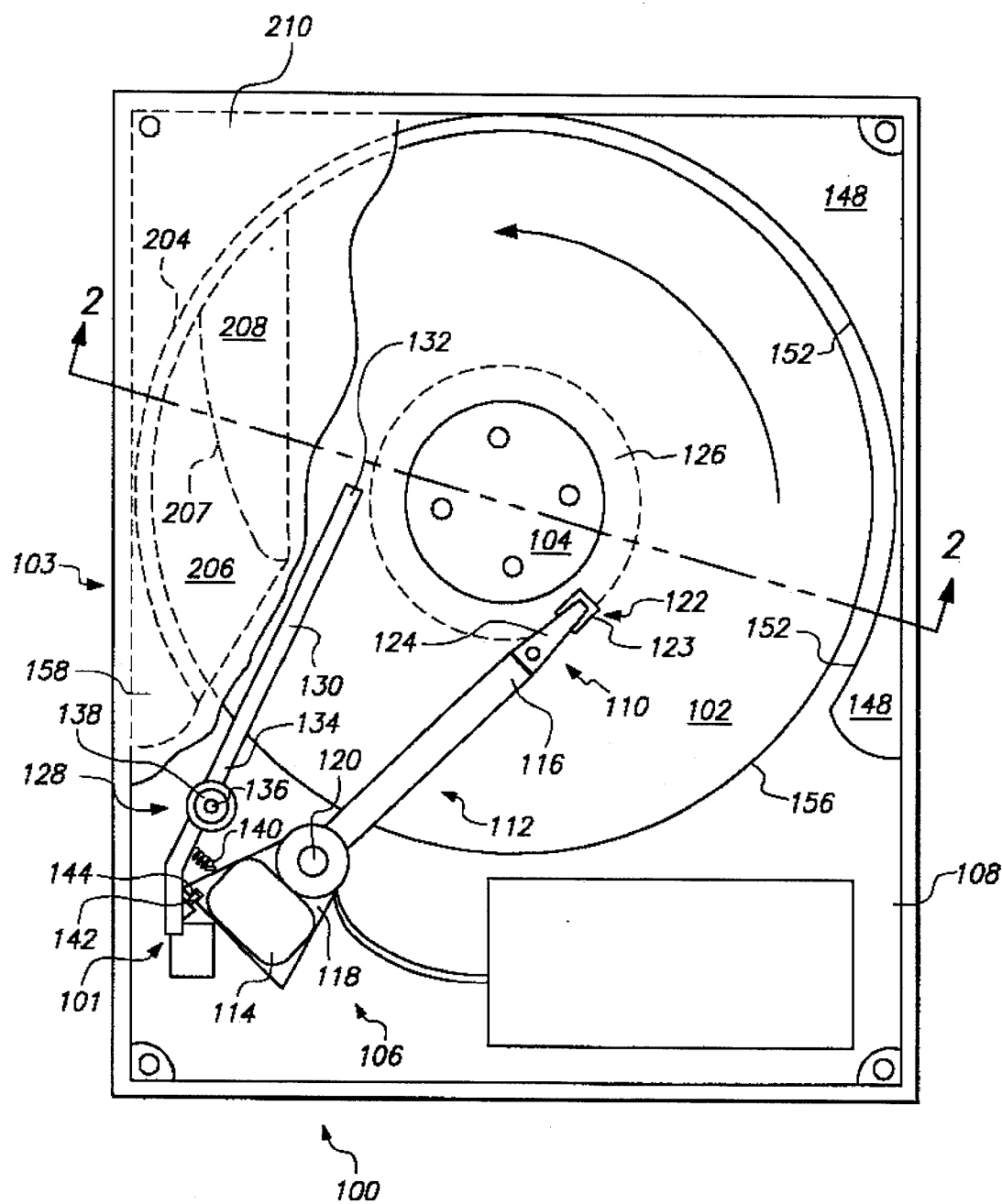
FIG. 1 depicts a top, plan view of a disk drive incorporating the air guide of the present invention.

FIG. 1 depicts a top plan view of a disk drive 100 including a conventional air vane latch mechanism 101 as well as an associated air guide 103 employing the principles and aspects of the present invention. The disk drive 100 contains a rotatable storage disk 102, a spindle motor (not specifically shown), a hub 104, an actuator assembly 106, and a base casting 108 to which the various components of the disk drive are mounted.

Typically, the storage disk 102 is coated with a magnetic material that stores data in concentric tracks of magnetic domains. However, as those skilled in the art will realize from the following disclosure, besides a magnetic storage medium, the storage medium could also be optical, magneto-optical, and the like.

To achieve disk rotation, the spindle motor is mechanically coupled through the spindle hub 104 to an inner diameter of the disk. In modern hard disk drives, the spindle motor is integrated into the hub that supports the storage disk and, as such, the spindle motor directly rotates the storage disk.

The actuator assembly 106 further contains a transducer assembly 110, a carriage assembly 112, and an actuator voice coil motor 114. The depicted actuator assembly 106 is a rotary-type assembly. Nonetheless, from the following discussion, those skilled in the art will realize that the invention is also capable of use with a linear-type voice coil actuator assembly.

In the rotary actuator assembly 106, the transducer assembly 110 is attached to a first end 116 of the carriage 112, e.g., by ball swaging, while the voice coil of the actuator motor 114 is attached to a second end 118 of the carriage by adhesive or by integral molding thereto. Centrally located along the carriage is journal 120 about which the actuator assembly rotates. The journal 120 is located adjacent to the storage disk 102 such that the carriage 112 extends the transducer assembly 110 over the surface of the storage disk 102. Consequently, selective activation of the actuator motor 114, typically a voice coil motor (VCM), rotates the actuator assembly 106 about the journal 120 and accurately positions the transducer assembly 110 over the surface of the storage disk 102. As such, data can be conventionally written to and read from the storage disk 102 by read/write transducers 122 of the transducer assembly 110.

Typically, transducer assembly 110 contains, on each side of the storage disk, a transducer 122 formed on an air bearing slider 123, and a load beam 124. The load beam 124 connects, at one end, to the carriage while the other end supports the slider and its transducer over the disk surface. The load beam 124 preloads or biases the slider toward the surface of the disk such that when the storage disk is not rotating, the slider 123 rests upon the disk. On the other hand, when the storage disk is rotating, the slider-transducer combination overcomes the preload force and "flies" just above the disk surface on an "air bearing" in accordance with conventional Winchester disk drive operating principles. During flight, the actuator assembly 106 positions in unison the load beams 124 and their associated slider-transducer combinations over the surfaces of the disk 102 in order to read and write data from and to each selected disk surface. However, when the disk drive is deactivated, the transducers 122 must be "parked" at a position where they will not damage the surfaces of the disk while resting thereupon, e.g., the transducers are parked in a designated "landing zone". Typically, the landing zone 126 is an annular portion of the storage disk surface that is nearest the hub. This inner annular region defines the least amount of available disk area, and its dedication as a landing zone results in the least amount of otherwise usable data storage space being lost. An air vane actuator latch 128 latches the actuator assembly 106 as the transducers come to rest in the landing zone 126.

The air vane actuator latch 128 contains a rigid air vane 130 (typically formed of Duracon or hardened urethane) having one end 132 extending over the disk surface and a second end 134 rotatably journalled about a cylindrical shaft 136 that forms an axis of rotation for the air vane. Typically, the air vane is forked such that one vane member extends over each surface of the disk. The air vane is journalled to the shaft by a bearing 138 or a Teflon™ bushing surrounding the shaft 136. The shaft 136 is an integral portion of the base casting 108 of the disk drive. Latching mechanism 101 extends from the journalled end of the air vane and has a latching pin 142 at its distal end. The latching pin is formed to interfit a detent 144 in a moveable portion of the actuator assembly 106. The pin lodges in the actuator assembly only when the actuator assembly has positioned the transducers in the landing zone and the disk ceases rotation. The latching mechanism is biased toward the actuator assembly by a spring 146 having an illustrative force of 0.8 grams. The spring attaches, at one end, to the latching mechanism, and at another end to a fixed location on the enclosure. Alternatively, the spring may be a clock spring wound about the shaft 136.

In operation, when the disk 102 is at rest, the actuator assembly 106 is latched in a fixed or latched position. On the other hand, when the disk attains a predetermined rotational rate, e.g., 3600 rpm, the windage produced by the rotating disk pushes on the air vane 130. The air vane pivots about the journalled shaft and disengages the pin 142 from the detent 144 in the actuator assembly 106. Consequently, the actuator assembly 106 is free to position the transducers 122 over the surface of the disk 102.

To provide sufficient windage to mobilize the air vane 130, two air guides are provided. A peripheral air guide 148 protrudes from the base casting 108 of the disk drive enclosure and has an arcuate face portion 152 proximate the edge 156 of the disk 102. The peripheral air guide reduces air turbulence and maintains a viscous air flow proximate the disk surface. A second air guide 158 is formed of two cooperative members (200 and 202 in FIG. 2 discussed below). Together these two members channel air flow from the surface of the disk toward the air vane. Specifically, the two members extend partially over the upper and lower surfaces of the disk and are positioned in close proximity to these surfaces. As such, windage is channeled toward the distal end 132 of the air vane 130 to maximize the torque about the journalled shaft 136.

Figure 2:
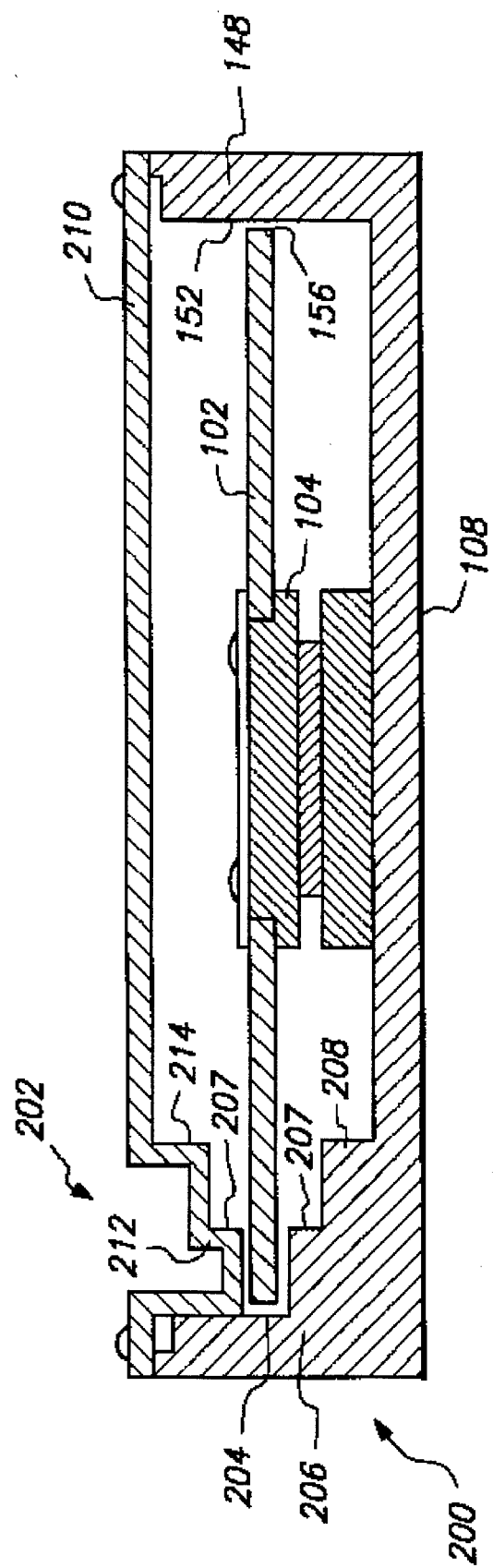
FIG. 2 depicts a partial cross-section along line 2—2 in FIG. 1.

FIG. 2 depicts a cross sectional view of the disk drive along line 2—2 shown in FIG. 1. The peripheral air guide 148 is proximate to the disk edge 156 such that the air flow is controlled and maintained near the disk surface. Additionally, the peripheral air guide reduces air turbulence that could interfere with the viscous air flow relied upon to produce a uniform air bearing and to unlatch the air vane latch mechanism. The second air-guide 158 contains the first guide member 200 (upper) and the second guide member 202 (lower). The first guide member 200 is formed (casted) as an integral part of the base casting 108. The first guide member contains an arcuate face area 204 that is proximate the edge 156 of the disk 102. This area operates in the same manner as the peripheral air guide, i.e., to reduce turbulence in the air flow about the disk. From this surface area extends a channeling member 206 and a shrouding member 208 that are formed proximate the disk surface. The shrouding member 208 extends partially over the surface of the disk and maintains the air flow near the disk surface. The air flow channeling member extends to a lesser extent over the disk surface, but is positioned closer to the disk surface than the shroud member. As such, the channeling member channels, along an arcuate surface 207 facing the hub 104, the windage located between the disk and the shroud member inward toward the hub. As such, the channeling member increases the quantity of windage as well as the force applied to the distal end of a lower fork of the air vane.

The second air guide member 202 (upper) is formed (stamped) in the top cover 210 of the disk drive. The cover interfits the sides of the base casting 108 to enclose the disk drive components. The cover has an air channeling member 212 and a shrouding member 214 that match the components of the lower air guide member 200 in both design and function. The second air guide member is typically formed by stamping the shape of the air guide into the sheet metal that is the cover. As such, the air flow along the top surface of the disk is also channeled toward the distal end of the upper fork of the air vane. In response to the increased windage force on the upper and lower forks of the air vane caused by the air guide, the air vane latch functions with the windage provided by only a single disk.

Figure 3:
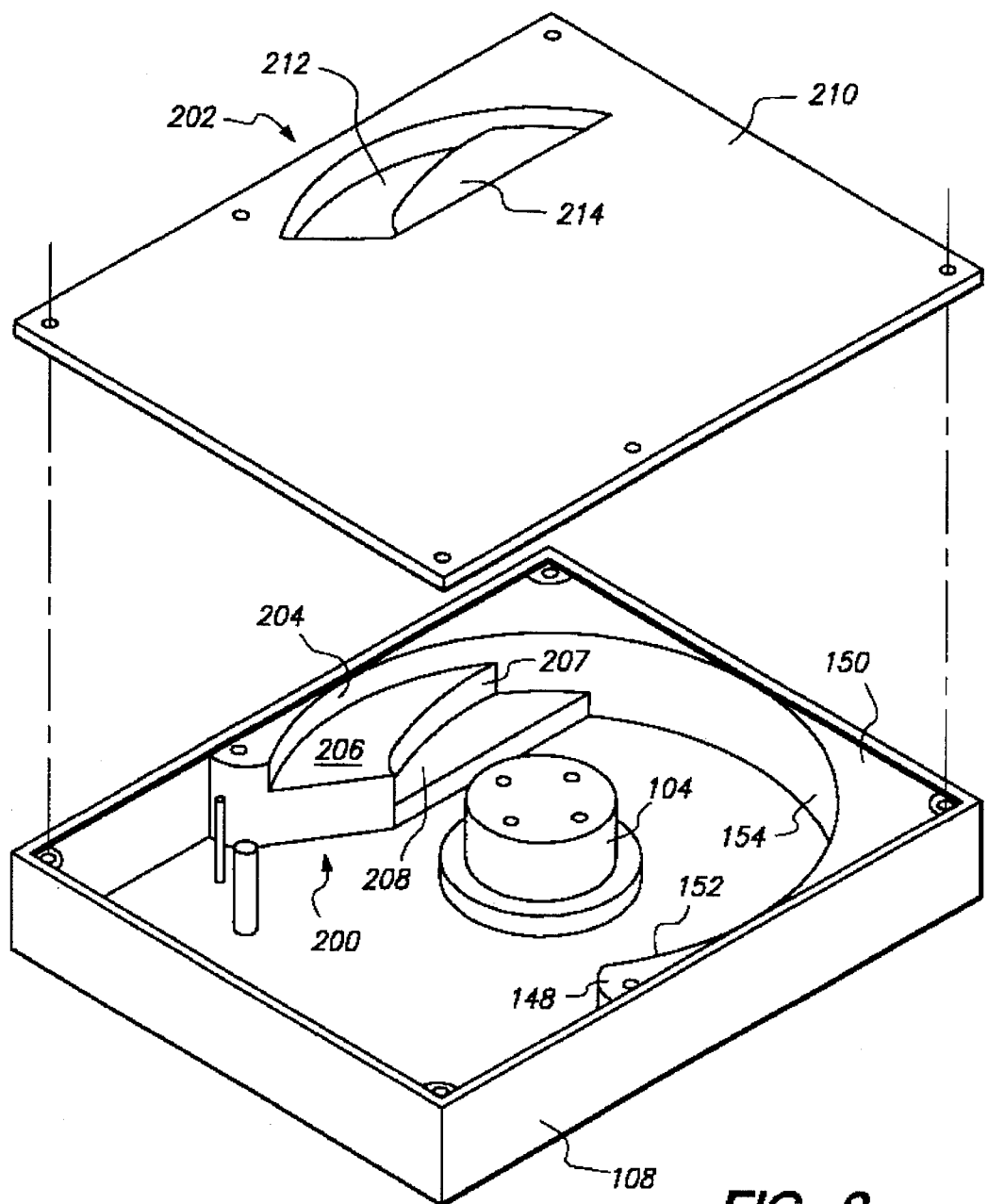
FIG. 3 depicts a perspective view of a disk drive enclosure containing a base casting and a cover that incorporate the teachings of the present invention.

FIG. 3 depicts a perspective view of the disk drive enclosure. This enclosure contains a base casting 108 typically fabricated from aluminum and a cover 210 that is typically fabricated from stamped steel. The lower air guide member 200 is cast in the base casting during fabrication of the base casting. On the other hand, the upper air guide member 202 is stamped into the cover as that portion is fabricated. When the disk drive is ultimately assembled, the two air guide members 200 and 202 of the air guide become proximate both surfaces of the rotating disk and operate as discussed above. Of course, these two members of the air guide could be fabricated of plastic, nylon, or some other material and then respectively attached, using an adhesive or other fastening means, to the base casting and the cover.

Figure 4:
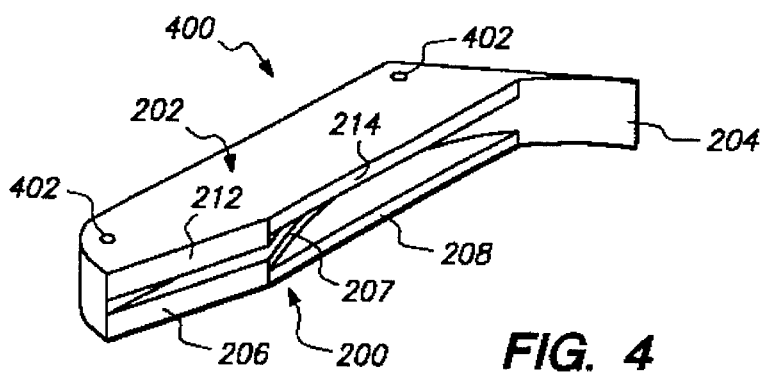
FIG. 4 depicts a unitary air guide in accordance with an alternative embodiment of the invention.

Alternatively, as depicted in FIG. 4, if the disk drive enclosure is designed providing access to the edge of the disk, the second air guide can be fabricated as an insertable unitary air guide 400. As the disk drive is assembled, the unitary guide is inserted and affixed, via screw holes 402, to the base casting. The unitary air guide 400 contains the same basic components and functions in the same manner as the second air guide described above (air guide 158 in FIGS. 1, 2, and 3). Although, in this embodiment, area 204 forms an intermediary member that maintains the upper and lower air guide members 200 and 202 in a spaced apart, parallel relation. As such, once assembled, the upper and lower air guide members straddle the rotating disk. Consequently, the same advantages are achieved with the unitary air guide as the two part air guide.

Although various embodiments which incorporate the teachings of the present invention have been shown and described in detail herein, those skilled in the art can readily devise many other varied embodiments that still incorporate these teachings.

What is claimed is:

1. In a disk drive having a single rotating disk and a rotating, biased air vane actuator assembly, an apparatus comprising:

a stationary air guide, attached to an enclosure of said disk drive, for channeling windage from said single rotating disk toward an air vane of said rotating biased air vane actuator assembly and for reducing airflow turbulence, said stationary air guide including:

a first inside member and a second guide member, said first and second guide members each contain a shrouding member for maintaining air flow proximate a disk surface, and a channeling member, protruding from the shrouding member, for channeling the air flow inwardly toward a center of the disk, said first guide member being in a parallel spaced apart relation with an upper surface of said single rotating disk and extending over a portion of said upper surface, said second guide member being in a parallel spaced apart relation with a lower surface of said single rotating disk and extending over a portion of said lower surface, wherein windage from said single rotating disk is channeled and controlled by said stationary air guide, to produce a reaction torque in said rotating biased air vane actuator assembly sufficient to overcome a bias force biasing said rotating biased air vane actuator assembly and unlatch said rotating biased air vane actuator assembly from a latched position.

2. The apparatus of claim 1 wherein said channeling member has an arcuate shaped face that channels the air flow.

3. In a disk drive having a single rotating disk and a rotating, biased air vane actuator assembly, an apparatus comprising;

a first stationary air guide, attached to an enclosure of said disk drive, for channeling windage from said single rotating disk toward an air vane of said rotating, biased air vane actuator assembly, said first stationary air guide shrouds an upper and a lower surface of said single rotating disk proximate an edge of said disk, said first stationary air guide including:

a first guide member and a second guide member, said first and second guide members each contain a shrouding member for maintaining air flow proximate a disk surface, and a channeling member, protruding from the shrouding member, for channeling the air flow inwardly toward a center of the disk, said first guide member being in a parallel spaced apart relation with said upper surface of said single rotating disk and extending over a portion of said upper surface, said second guide member being in a parallel spaced apart relation with said lower surface of said single rotating disk and extending over a portion of said lower surface; and a second stationary air guide, located proximate said disk for peripherally shrouding a portion of said edge of said disk to reduce airflow turbulence, wherein windage from said single rotating disk is channeling and controlled by said stationary air guides, to produce a reaction torque in said rotating, biased air vane actuator assembly sufficient to overcome a bias force biasing said rotating, biased air vane actuator assembly and unlatch said rotating, biased air vane actuator assembly from a latched position.

4. The apparatus of claim 3 wherein said channeling member has an arcuate shaped face that channels the air flow.

* * * * *